(12) United States Patent
Grosser (10) Patent No.: US 6,220,187 B1
(45) Date of Patent: Apr. 24, 2001

(54) PARTIALLY RESTRAINED SOLID WOOD CONSTRUCTION SYSTEM

(76) Inventor: Joseph A. Grosser, P.O. Box 209, Willow Creek, CA (US) 95573

( * ) Notice: Subject to any disclaimer, the term of this patent is extended or adjusted under 35 U.S.C. 154(b) by 0 days.

(21) Appl. No.: 09/089,699

(22) Filed: Jun. 3, 1998

(51) Int. Cl.⁷ .................................................. A47B 47/00
(52) U.S. Cl. ........................................... 108/155; 108/158
(58) Field of Search .................................. 108/155, 157.1, 108/158, 157.15, 153.1; 248/188, 188.1; 403/403, 230

(56) References Cited

U.S. PATENT DOCUMENTS

| | | | |
|---|---|---|---|
| 642,962 | * | 2/1900 | Danner .................................. 108/155 |
| 769,699 | * | 9/1904 | Klein .................................. 108/153.1 |
| 1,585,459 | * | 5/1926 | Bauer .................................. 108/155 |
| 2,208,704 | * | 7/1940 | Shannon .......................... 108/155 X |
| 2,490,018 | * | 12/1949 | Davis .................................. 403/403 X |
| 3,136,517 | * | 6/1964 | Gariepy .................................. 248/188 |
| 4,317,416 | * | 3/1982 | Baum et al. ...................... 108/157.1 |
| 4,893,961 | * | 1/1990 | O'Sullivan et al. ............ 403/403 X |

FOREIGN PATENT DOCUMENTS

1204 * 1/1911 (GB) ..................................... 108/155

* cited by examiner

*Primary Examiner*—Janet M. Wilkens
(74) *Attorney, Agent, or Firm*—Lyon & Lyon LLP (57) ABSTRACT

A system for sturdily joining one or more supporting members to a solid wood surface, such as a table top or raised panel (e.g. a panel used for constructing a door), while minimizing distortion to the table top or door panel, is provided. Such structural assemblies producible in ready-to-assemble format are also provided. Brackets are rigidly connected to the supporting members or structure, but are each connected to the solid wood surface in two ways: (1) with a pin connection, which prevents translation in one or more directions and may prevent separation, and (2) with one or more sliding connections, which prevent separation but allow the solid wood surface to expand or contract freely in a direction perpendicular to that of the wood grain 0n the solid wood surface. The structural assembly produced with the resulting partially restrained connection is sturdy, yet permits the solid wood surface to remain free from distortion when it is subjected to changes in environment.

16 Claims, 8 Drawing Sheets

PARTIALLY RESTRAINED SOLID WOOD CONSTRUCTION SYSTEM

FIELD OF THE INVENTION

The field of the present invention relates to the construction of ready to assemble wood products such as furniture, and frame-and-panel doors, or particularly, to methods used for fastening supporting members to a flat surface of solid wood while minimizing distortion to the solid wood surface.

BACKGROUND OF THE INVENTION

"Ready to assemble" furniture is a rapidly growing segment of the furniture industry, due in part to its relatively low retail cost, but also to the small volume of space such furniture occupies in its pre-assembled state, which translates into reduced warehousing costs and larger inventories for popular items. Most commercially available "ready to assemble" furniture items, however, have drawbacks which limit their longevity and ease of assembly.

Despite its moniker, assembling most ready to assemble ("RTA") furniture is far from simple. Instead, the task is often time-consuming and frustrating. The consumer of most RTA furniture must toil with numerous bolts, threaded inserts and clips, and follow arduous step-by-step diagrams. All too often, the resulting piece of furniture is not well-suited to subsequent disassembly and re-assembly, as would be helpful or may be required for moving. Moreover, RTA furniture is often not sturdy enough to withstand rigorous use.

Conventional RTA construction methods also preclude the use of large, solid wood members—as may be used for table tops, for instance—due to problems with hygroscopic distortion as the equilibrium moisture content of the wood changes. Natural solid wood (as distinguished from composite and/or chemically treated wood materials) is typically sensitive to changes in environment; it expands with increases in temperature and/or humidity, and likewise contracts with reductions in these variables. Conventional RTA construction of tables, for instance, utilizes the table top as an integral structural member, where the top is rigidly mounted to the table legs and one or more aprons. Season to season, if so restrained, solid wood table tops are subjected to repeated expansion and contraction cycles which may cause the solid wood to distort (resulting in a 'wobbly' table) or even to buckle and split. Without restraining such a solid wood table top, however, it is difficult to construct a table top sturdy enough to withstand the rigors of everyday use.

Hygroscopic distortion also presents problems with the construction of frame-and-panel doors. If a raised panel is used as an integral structural member and restrained from free expansion and contraction, then it may distort buckle and split with changes in environment. If such a panel is not sufficiently restrained, however, then the resulting door may appear to be shoddily constructed as the panel shifts within its surrounding panel frame when the door is operated.

SUMMARY OF THE INVENTION

The present invention is directed to a novel system and method for constructing durable RTA furniture and frame-and-panel doors which incorporate a substantially planar solid wood member, while minimizing problems associated with hygroscopic distortion to such a member. These problems are minimized by the use of joining members (or "brackets" herein) to which a substantially planar solid wood member and one or more supporting members are both attached. These brackets are rigidly connected to the supporting members, which support the substantially planar solid wood member in a pre-defined position. These brackets further provide multiple discrete connections, of two different types, to the aforementioned substantially planar solid wood member. In the aggregate, these multiple discrete connections create a partially restrained but sturdy connection between the brackets and the substantially planar solid wood member. This partially restrained connection prevents hygroscopic distortion to substantially planar solid wood members such as table tops or door panels.

DETAILED DESCRIPTION OF THE INVENTION

Solid wood is characterized by having a grain direction. When solid wood is subjected to changes in environment—notably, changes in relative humidity—the equilibrium moisture content of the wood changes. An increase in equilibrium moisture content generally causes solid wood to expand, whereas a decrease in equilibrium moisture concomitantly causes solid wood to contract. The characteristic of solid wood which bears most directly on the operation of the present invention is the unidirectional nature of these expansions and contractions; that is, the aforementioned movements due to changes in equilibrium moisture content occur almost entirely in a direction perpendicular to the grain direction.

Applying this understanding of the unidirectional nature of wood expansion and contraction, the present invention incorporates joining members or brackets to provide, in the aggregate, a partially restrained connection to the substantially planar solid wood member. Each bracket is connected to the solid wood member by two types of discrete connections: (1) a pin connection, which prevents translation of the substantially planar solid wood member relative to each bracket at the location of the pin connection, and (2) at least one sliding connection, which allows the solid wood member to freely expand or contract, but prevents separation of the solid wood member from the bracket. It is essential for the brackets to be applied in such a manner as to orient each sliding connection substantially perpendicular to the grain direction of the solid wood member. As will be described in greater detail below, the specified use at each bracket of a pin connection and at least one sliding connection provides, in the aggregate, a partially restrained connection between the bracket and the substantially planar solid wood member.

A sliding connection is defined for purposes of the present invention as a connection that prevents separation of the solid wood member relative to the bracket, but simultaneously permits translation of the substantially planar solid wood member in a direction perpendicular to its wood grain direction. Each bracket employs at least one sliding connection to the substantially planar solid wood member.

Ensuring proper operation of sliding connections used with the present invention requires that frictional forces in the direction of expansion or contraction of the substantially planar solid wood member be reduced below a threshold which would preclude free movement. For instance, a preferred embodiment of the present invention incorporates a sliding connection comprising a longitudinal slot formed in the bracket and one or more screws driven through this slot into the substantially planar solid wood member. The following steps have been found to sufficiently reduce friction within this particular sliding connection to ensure smooth operation: (1) removing all burrs and working all surfaces forming the interior edge of the longitudinal slot until fairly smooth to minimize physical obstructions against the screws; (2) utilizing screws with tapered heads to minimize the contact area between the screw head and the bracket; (3) ensuring that these screws only are tightened only to the point that they prevent separation between the bracket and the substantially planar solid wood member.

A pin connection is defined for purposes of the present invention as a connection that prevents translation of the substantially planar solid wood member relative to the bracket at the point of the pin connection, but simultaneously does not restrict any substantial segment of the solid wood member from freely expanding in a direction perpendicular to its wood grain. Each bracket provides a pin connection to the substantially planar solid wood member. Because multiple brackets are employed in the present invention, all pin connections in a particular structural assembly embodying the present invention must be oriented in a substantially collinear fashion along the grain direction of the substantially planar solid wood member to prevent hygroscopic distortion to this member.

In preferred embodiments directed to RTA furniture, connections between a bracket and the substantially planar solid wood member are pre-manufactured, and need not be undone to disassemble the furniture for moving or transport. In contrast, connections between the bracket and the supporting member(s) are intentionally left undone by the manufacturer to conserve shipping volume. These connections are to be completed by the consumer, since they are simple connections—preferably made using common bolts or studs with nuts—requiring no special expertise and minimal effort to perform. The preferred embodiments of the present invention will now be discussed with reference to the drawings.

FIGS. 1–4 illustrate an assembled RTA table 1 according to a preferred embodiment of the present invention. Table 1 includes a substantially planar solid wood member, or "table top" 20, mounted via joining members, or brackets, 50, 52 and optional aprons 40, 42, 44, 46 to supporting members, or table legs, 30, 32, 34, 36. The table top 20 is supported in a pre-defined position by supporting members 48 which include table legs 30, 32, 34, 36 and optional aprons 40, 42, 44, 46. The optional aprons 40, 42, 44, 46 enhance the rigidity of table legs 30, 32, 34, 36, especially in an embodiment such as shown in FIGS. 1–4 where the aprons 40 and 44 (shown in FIGS. 2 and 4) are affixed to each of each of the table legs 30, 32, 34, and 36 via a notched portion 38. The optional aprons 40, 42, 44, 46 may further enhance the aesthetics of the assembled RTA table 1 by disguising the brackets 50, 52 and assorted connecting hardware. If used, however, the optional aprons 40, 42, 44, 46 are preferably attached to the brackets 50, 52, since conventional attachment of such aprons to the table top 20 would restrain its hygroscopic expansion and eventually result in its distortion.

Figure 1:
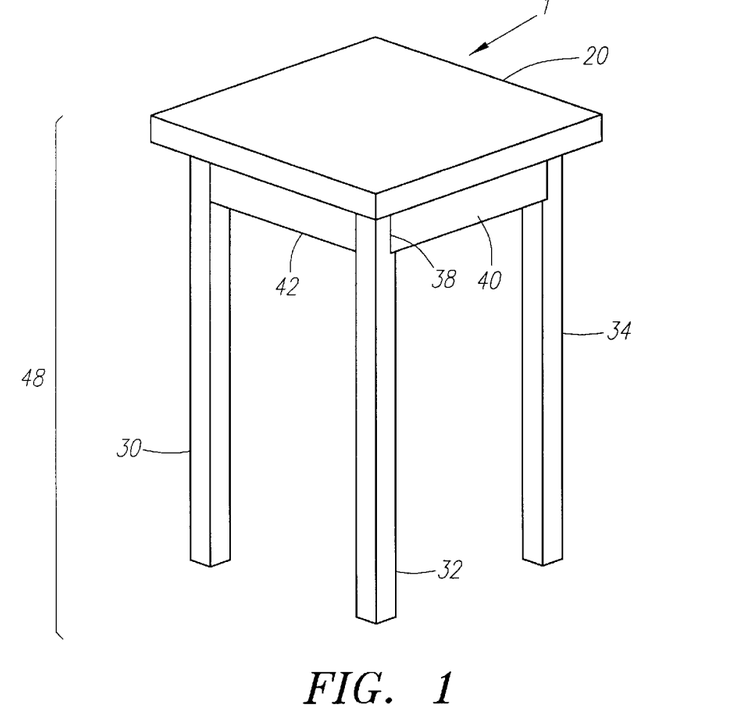
FIG. 1 is a top front perspective view of a table constructed according to a first preferred embodiment of the present invention.
Figure 2:
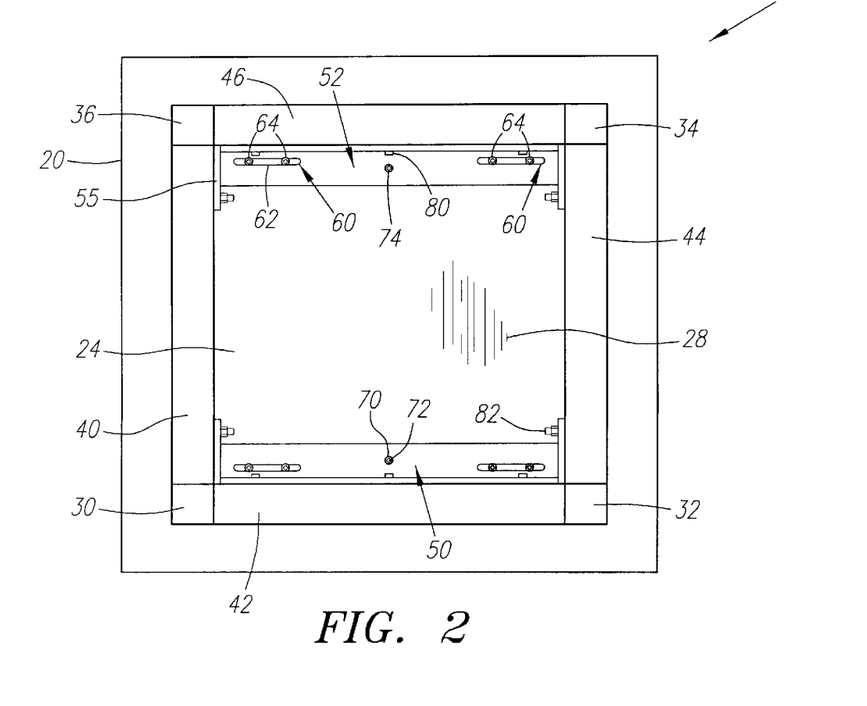
FIG. 2 provides a bottom plan view of the table of FIG. 1.
Figure 3:
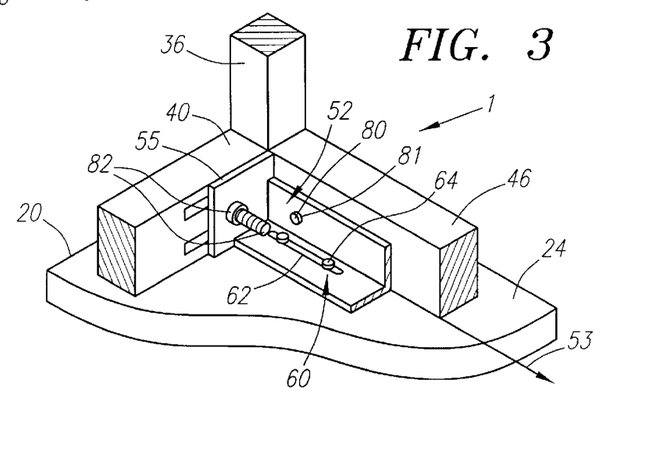
FIG. 3 is a cut-away bottom perspective view of a corner of the table of FIG. 2.
Figure 4:
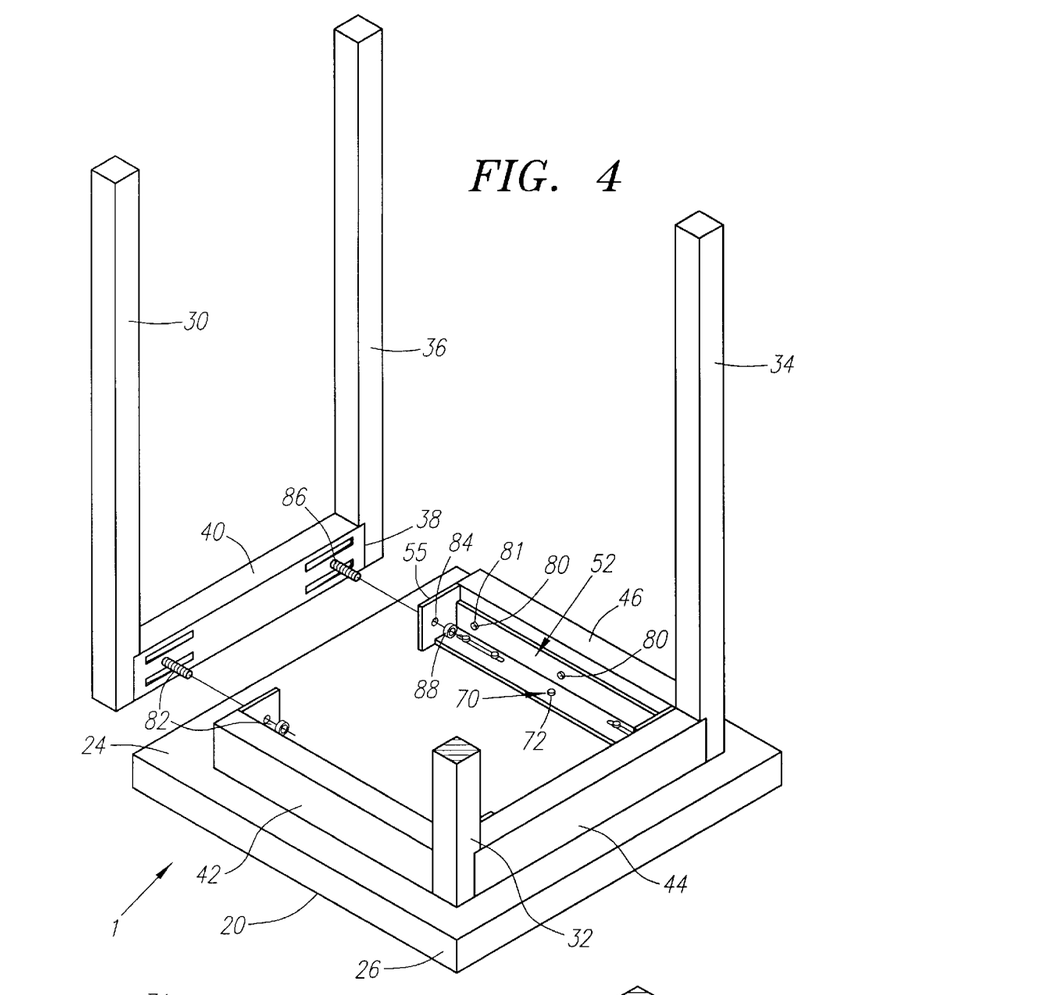
FIG. 4 is a partially-exploded bottom perspective view of the table of FIG. 1.

FIGS. 2–4 illustrate the mounting system for mounting the table legs 30, 32, 34, and 36 to the table top 20. The mounting system includes two L-shaped brackets 50, 52. The brackets 50, 52 are of the same construction; thus the structure of only bracket 52 need be described, such structure being applicable to bracket 50. The bracket 52 includes two sliding connections 60 and one pin connection 70 to connect the bracket 52 to the bottom surface 24 of the table top 20. Each sliding connection 60 includes a slot 62 (defined by the bracket 52) and connecting hardware 64 which slidably attaches the bracket 52 to the table top 20. The connecting hardware 64 preferably comprises of screws with tapered heads, but may alternatively comprise various combinations of standard hardware—such as threaded bolts coupled with tapped holes in the table top 20 or threaded nuts embedded in the table top 20, and studs embedded in the table top 20 coupled with threaded nuts—well known to those skilled in the art, that provide a durable connection but also may be readily adjusted to provide an optimum amount of compressive force. An optimum amount of compressive force is that which prevents separation between the solid wood member 20 and the brackets 50, 52, while simultaneously allowing unrestrained growth of the table top 20.

Figure 2A:
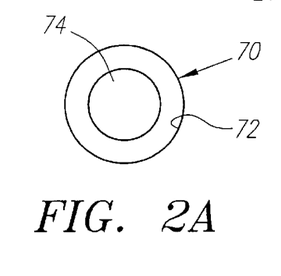
FIG. 2A is an expanded sectional view of a pin connection employed in the table of FIG. 2.

In this preferred embodiment, each pin connection 70 includes an aperture 72 (defined by bracket 50 or 52) and connecting hardware 74 which prevents translation of the substantially planar solid wood member, or table top, 20 relative to each bracket 50, 52 at the location of pin connection 70. An expanded sectional view of the pin connection 70 is shown in FIG. 2A, with connecting hardware 74 passing through aperture 72. Unlike each sliding connection 60, each pin connection 70 need not be readily adjustable via connecting hardware 74. The compressive force provided by a pin connection of the 'aperture and connecting hardware' variety, such as pin connection 70, between the table top 20 and a bracket 50 or 52 is generally greater than provided by a comparable sliding connection 60. However, the compressive force provided by pin connection 70 is preferably below the threshold which would crush or distort table top 20. Connecting hardware 74 preferably comprises one or more screws with tapered heads, but may alternatively consist of various standard hardware (not shown) or combinations thereof, well known to those skilled in the art, to provide a discrete and rigid connection, such as screws, bolts, nails, or staples—or even bolts coupled with tapped holes in table top 20 or threaded nuts embedded in table top 20, and studs embedded in table top 20 coupled with threaded nuts, as described previously. Notably, each pin connection 70 of brackets 50, 52 is arranged collinearly along wood grain direction 28, so as not to restrain any significant segment of substantially planar solid wood member 20 from freely expanding.

FIG. 3 is a detailed view of one corner of the table 1 illustrating table leg 36 not directly fastened to bracket 52, but instead fastened via optional apron 40. The table leg mounting hardware 82 provides a simple and removable—but rigid—connection. The table leg mounting hardware 82 may comprise a threaded stud 86 embedded in the apron 40 which protrudes through aperture 84 (shown in FIG. 4) in bracket 50 or 52 to mate with a nut 88. Alternatively, however, table leg mounting hardware 82 may comprise (not shown) bolts coupled with tapped holes or embedded nuts in optional aprons 40, 44. The apron 46 is rigidly attached to the bracket 52 via a screw 80 driven through the aperture 81; however, since it is not designed for removal and it does not restrain growth of the table top 20, attachment between the apron 46 and the bracket 52 may alternatively be made by nails, staples, studs and bolts, or even by use of adhesives. The bracket 52 is preferably fashioned from metal plate which is bent around longitudinal axis 53 to enhance stiffness and facilitate mounting of optional apron 46. The end portion 55 of the bracket 52 is preferably attached to the bracket 52 by welding, to provide a strong and durable connection and further enhance rigidity of bracket 52. Alternatively, the entire bracket 52 could be manufactured from a single metal plate, with the end portion 55 comprising a tab bent into position along one edge and welded along a second edge to the bracket 52.

FIG. 4 shows more clearly how the table legs 30, 36 may be attached to the apron 40 at each notched portion 38. Thus, the entire RTA table 1 may be shipped to the consumer in three pieces: (1) the table top 20 to which the brackets 50, 52 are already attached; (2) the table legs 30, 36 to which the apron 40 is attached; and (3) the table legs 32, 34 to which the apron 44 is attached. To assemble RTA table 1, the table legs 30, 36 are oriented as shown, and then each stud 86 is inserted through each hole 84 to mate with nut 88, and finally each nut 88 is tightened with standard tools. In this maimer, a sturdy and long lasting RTA table 1 with a solid wood table top 20 may be assembled by the consumer in a very short while by completing only four simple attachments.

Figure 5:
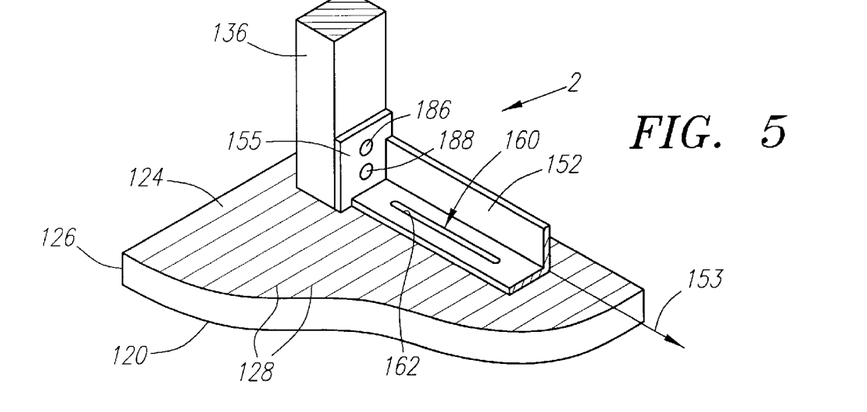
FIG. 5 is a cut-away bottom perspective view of a table constructed according to a first alternative embodiment of the present invention directed to ready-to-assemble furniture.

FIG. 5 is a cut-away bottom perspective view of a first alternative embodiment of a RTA table 2. The necessary connecting hardware is omitted, but is the same as shown in FIGS. 1–4. In this embodiment, which lacks optional apron members, a table leg 136 is mounted directly to the bracket 152 through apertures 186, 188 defined within an end portion 155 of the bracket 152 using table leg mounting hardware (not shown). Connection of the table leg 136 to the bracket 152 at multiple points (e.g. through apertures 186, 188) provides enhanced rigidity where, as in this embodiment, optional aprons are not employed. The bracket 152 attaches to the table top 120 with one or more sliding connections 160 and a pin connection (similar to pin connection 70 as in the previous embodiment), with the bracket 152 being oriented with a longitudinal axis 153 substantially perpendicular to the wood grain direction 128 of the table top 120. The sliding connection 160 includes a slot 162 (defined by the bracket 152) and connecting hardware (not shown) which slidably attaches the bracket 152 to the table top 20. Preferably, the table top 120 is provided to the consumer with the bracket 152 pre-attached by the aforementioned pin connection (not shown) and sliding connection 160, such that final assembly may be accomplished by attaching connecting hardware (not shown) through the apertures 186, 188.

Figure 6:
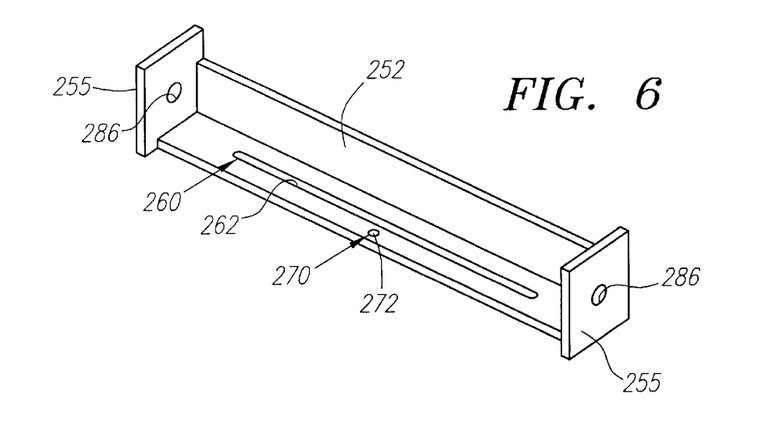
FIG. 6 is a bottom perspective view of a bracket according to a second alternative embodiment of the present invention directed to ready-to-assemble furniture.

FIG. 6 is a bottom perspective view of a bracket 252 according to a second alternative embodiment of the present invention. The bracket 252 contains a single longitudinal slot 262 through which one or (preferably) more sliding connections 260 may be made with connecting hardware (not shown) to a table top (not shown), as described previously. Pin connection 270 to a table top may be made through an aperture 272 defined in the bracket 252 with further connecting hardware (not shown), as described previously. The bracket 252 does not require multiple slots to provide more than one sliding connection 260. In this alternative embodiment, a single aperture 286 is provided in each end portion 255, 255 of bracket 252 for connecting to the table legs (not shown).

Figure 7:
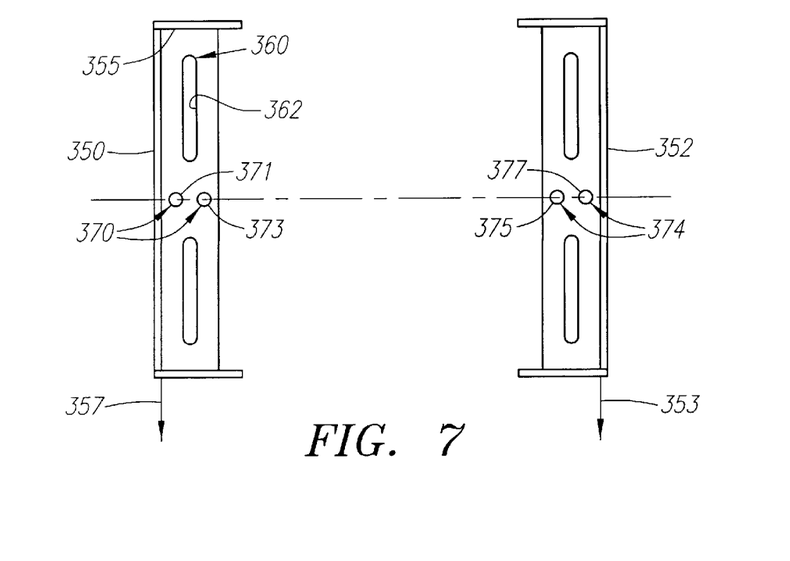
FIG. 7 is a bottom plan view of two brackets arranged collinearly according to a third alternative embodiment of the present invention directed to ready-to-assemble furniture.

FIG. 7 provides a bottom view of two brackets 350, 352, according to a third alternative embodiment of the present invention directed to RTA furniture. The brackets 350, 352 are arranged in parallel along longitudinal axes 353, 357 and collinearly with respect to the pin connections 370, 374. Multiple sliding connections 360 are present at each bracket, including slots 362. As shown in this embodiment, the pin connections 370, 374 at each bracket 350, 352 need not necessarily be confined to a single point, such as by a single screw, bolt, or nail, so long as each pin connection 370, 372 does not restrain a substantial segment of the solid wood member (not shown) in a direction perpendicular to its wood grain direction (not shown). Multiple screws, bolts, nails, or even staples may be included in a single pin connection 370 or 374, so long as the connecting hardware associated with all such pin connections 370, 372 are arranged substantially collinearly along the solid wood grain direction and do not restrain any significant segment of the solid wood member from freely expanding. In this embodiment, for instance, apertures 371, 373 are used to make pin connection 370, while apertures 375, 377 are used to make pin connection 374. As shown, pin connections 370 and 374—including component apertures 371, 373, 375, 377—are arranged substantially collinearly. When multiple sliding connections 360 are employed at each bracket, such as in the present embodiment—preferably with pin connection 370 or 372 oriented between the sliding connections along the longitudinal axis of the bracket (as shown)—then it is not necessary for the pin connection to prevent separation between the substantially planar solid wood member and each bracket.

Figure 8:
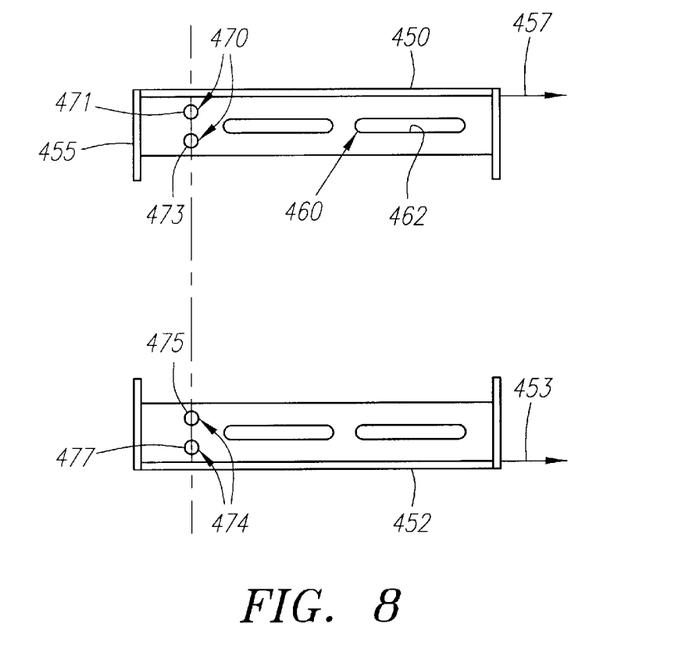
FIG. 8 is a bottom plan view of two brackets arranged collinearly according to a fourth alternative embodiment of the present invention directed to ready-to-assemble furniture.

FIG. 8 provides a bottom view of two brackets 450, 452, according to a fourth alternative embodiment of the present invention directed to RTA furniture. As in FIG. 7, the brackets 450, 452 are arranged in parallel along longitudinal axes 453, 457 and collinearly with respect to the pin connections 470, 474. The present embodiment differs from the third embodiment in that the pin connections 470, 474 are not located medially between the sliding connections 460 at each bracket 450, 452, but rather located distally and adjacent to the end section 455 of each bracket 450, 452. As the present embodiment illustrates, so long as the pin connections 470, 474 are located collinearly in a direction along the wood grain direction (not shown) of a table top (not shown), then it does not matter the point at which the pin connections 470, 474 are located along the lengths of longitudinal axes 453, 457 of the brackets 450, 452.

Figure 9:
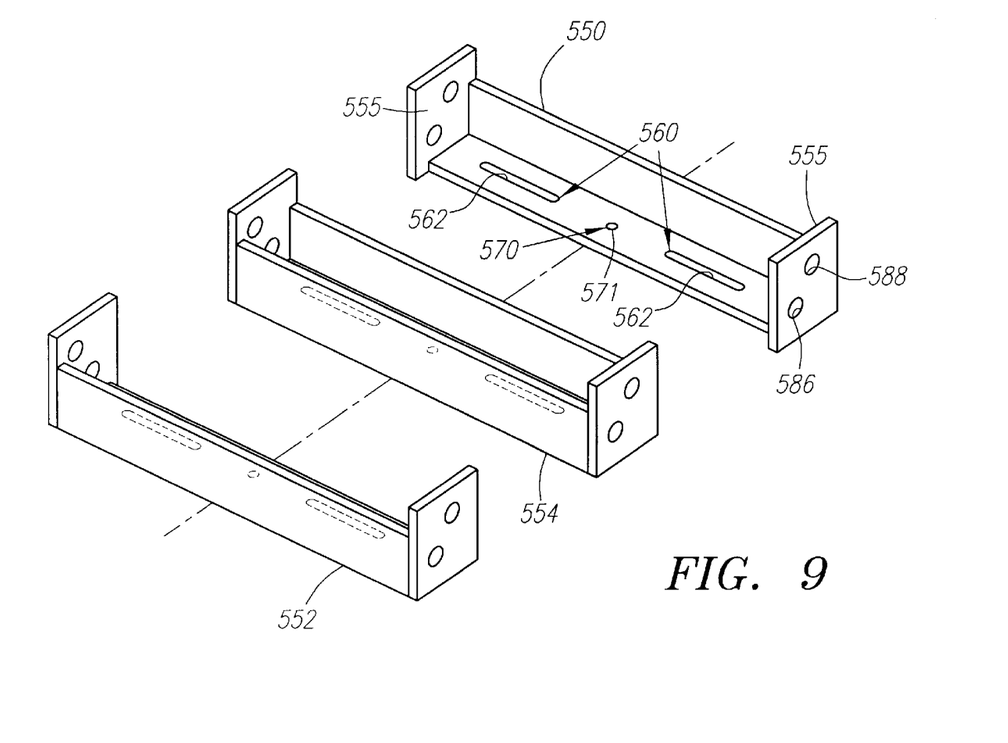
FIG. 9 is a bottom perspective view of three brackets arranged collinearly according to a fifth alternative embodiment of the present invention directed to ready-to-assemble furniture.

FIG. 9 provides an bottom perspective view of three brackets 550, 552, 554 according to a fifth alternative embodiment of the present invention directed to RTA furniture. This embodiment, illustrating the use of more than two brackets, may be employed for very long pieces of furniture such as tables—either with four table legs (not shown) and optional aprons (not shown) interconnecting these legs, or with a number of table legs greater than four (e.g. as presently illustrated, with six table legs). Each table leg may be attached directly to brackets 550, 552, 554 using standard hardware (not shown), as described previously, through apertures 586, 588 defined in the end portions 555 of brackets 550, 552, 554. The brackets 550, 552, 554 are arranged in parallel and collinearly with respect to the pin connection 570 at each bracket. Multiple sliding connections 560 are present at each bracket, each including a slot 562.

Figure 10:
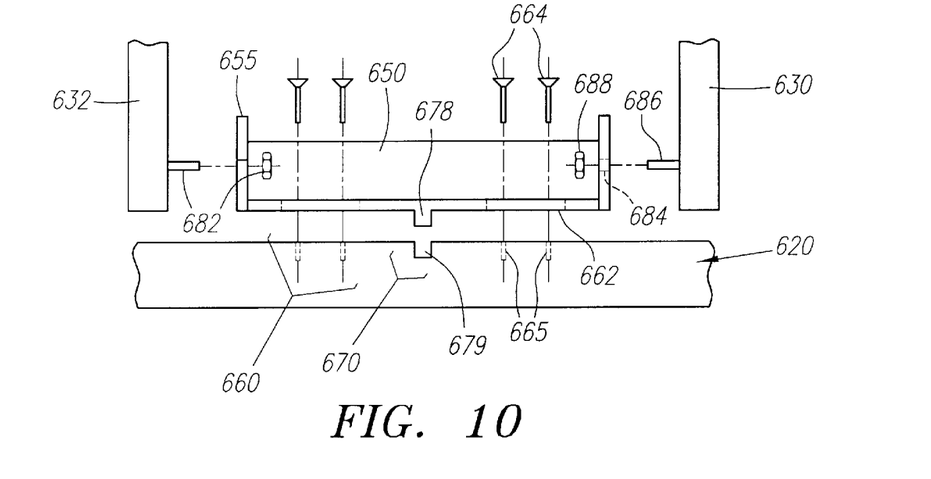
FIG. 10 is a partially-exploded side sectional view of a sixth alternative embodiment of the present invention directed to ready-to-assemble furniture.

FIG. 10 provides a bottom partially-exploded side sectional view of a sixth alternative embodiment of the present invention directed to ready-to-assembly furniture. As described previously in connection with FIG. 7, when multiple sliding connections are employed at each bracket, then it is not necessary for the pin connection to prevent separation between the substantially planar solid wood member and each bracket—especially where the pin connection is located medially between multiple sliding connections. In the present embodiment, translation between the bracket 650 and the table top 620 is prevented by a raised tab 678 which protrudes from the bracket 650 into a channel 679 defined by table top 620 along the wood grain direction (not shown) of table top 620. Pin connection 670 does not prevent separation between table top 620 and bracket 650; instead, separation is prevented by each sliding connection 660. Each sliding connection 660 includes a slot 662 defined in bracket 650 and connecting hardware 664 which may be driven through slot 662 into table top 620. Table legs 630, 632 are attached directly to bracket 650 through each aperture 684 defined within end portion 655 of bracket 650 using table leg mounting hardware 682. Table leg mounting hardware 682 at each table leg 630, 632 preferably comprises a threaded stud 683 embedded in each table leg 630, 632 coupled with threaded nut 688. As described previously, however, table leg mounting hardware 82 may alternatively comprise bolts coupled with holes tapped in or coupled with nuts embedded in table legs 630, 632.

Figure 11:
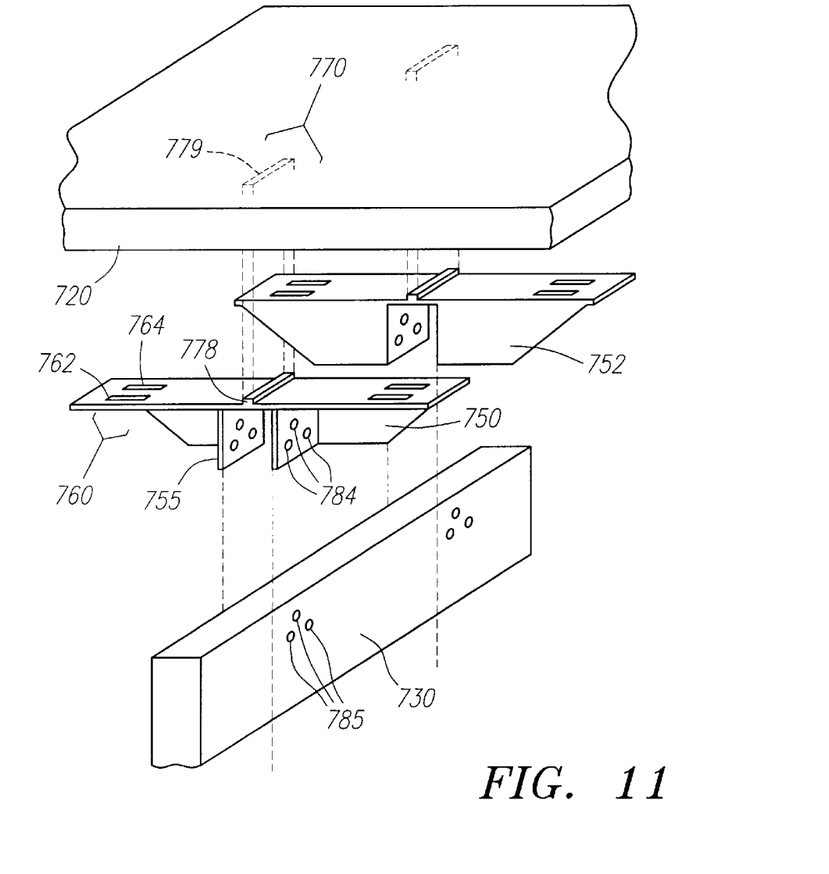
FIG. 11 is a partially-exploded top front perspective view of a seventh alternative embodiment of the present invention directed to ready-to-assemble furniture.

FIG. 11 illustrates a table top 720 which has only a single supporting member 730. As in FIG. 10, each pin connection 770 is accomplished by inserting the raised tab 778 of each bracket 750, 752 into a channel 779 defined in the table top 720. Multiple sliding connections 760 are maintained between each bracket 750, 752 and the table top 720 by way of slots 762, 764 using connecting hardware (not shown). Each bracket 750, 752 is rigidly but removably attached to the supporting member 730 with connecting hardware (not shown), preferably comprising nuts and bolts, driven through apertures 784 defined in each end portion 755 of each bracket 750, 752 and through corresponding apertures 785 defined in the supporting member 730.

Figure 12:
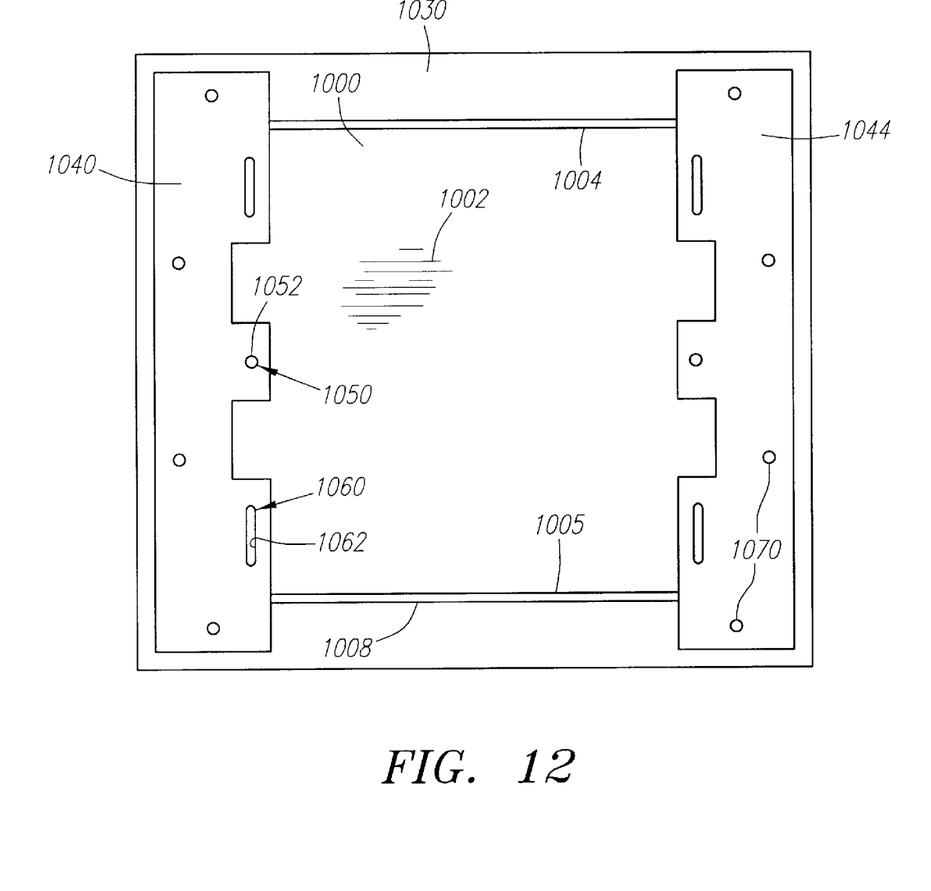
FIG. 12 is a rear view of a preferred embodiment of the present invention directed to a frame-and-panel door.

FIG. 12 provides a rear view of a preferred embodiment of the present invention directed to a frame-and-panel door with a recessed solid wood panel 1000. The solid wood panel 1000 is supported in position by a supporting member or frame 1030 using brackets 1040, 1044. The brackets 1040, 1044 are fastened to the frame 1030 by way of connecting hardware (not shown) such as screws, nails, or staples driven through the apertures 1070. Each bracket 1040, 1044 has a pin connection 1050 and at least one sliding connection 1060 to the frame 1030 to allow the solid wood panel 1000 to expand in a direction perpendicular to its wood grain direction 1002. Each pin connection 1050 is collinearly arranged along the wood grain direction 1002, and includes an aperture 1052 defined in each bracket 1040, 1044 and connecting hardware (not shown) such as screws, nails, or staples. Each sliding connection 1060 is oriented substantially perpendicular to wood grain direction 1002 of the solid wood panel 1000. Each sliding connection 1060 comprises a slot 1062 and connecting hardware (not shown), preferably tapered head screws. Alternatively, other connecting hardware which may readily adjusted to provide optimum clamping force, such as combinations of threaded bolts or studs and nuts, may be used as connecting hardware for each sliding connection 1060. To ensure that the solid wood panel 1000 is not peripherally restrained against expansion, it is important to ensure that a gap 1008 is left between each edge 1004, 1005 of the solid wood panel 1000, the gap 1008 being parallel to the wood grain direction 1002 and the inner stepped edge 1034 (shown in FIG. 13).

Figure 13:
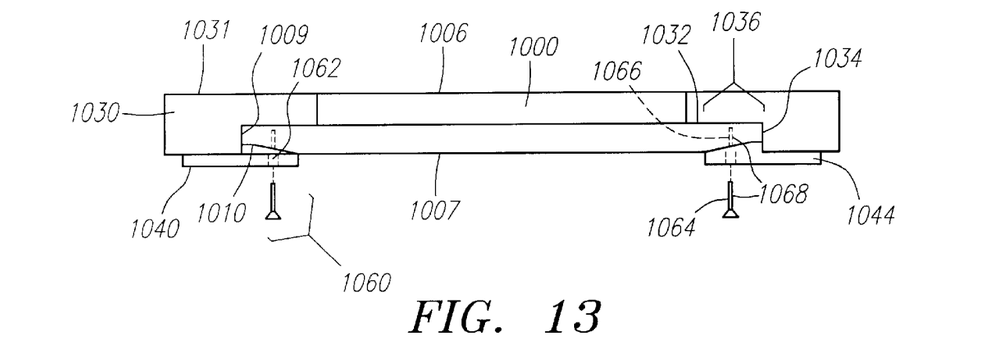
FIG. 13 provides a side sectional view of the frame-and-panel door of FIG. 12.

FIG. 13 provides a sectional view of the frame-and-panel door illustrated in FIG. 12. Since aesthetics are important to frame-and-panel doors, the brackets 1040, 1044 are preferably hidden from outside view by being attached to the inner surface 1008 of the solid wood panel 1000. The outer surface 1006 of the solid wood panel 1000 is placed behind the inner surface 1032 of the frame 1030, but in front of the brackets 1040, 1044, to thereby be positioned in the peripheral recess 1036 which is formed by the inner stepped surface 1032 and the inner stepped edge 1034 of the frame 1030. The optional beveled inner edge 1010 of the solid wood panel 1000 adjacent to the brackets 1040, 1044 reduces the frictional contact area between the panel 1000 and the brackets 1040, 1044 to promote smooth operation of each sliding connection 1060. Connecting hardware 1068 for the sliding connection 1060, including a tapered head screw 1064 and a hole 1066 in the solid wood panel 1000, is shown. To further ensure that each sliding connection 1060 operates smoothly, each peripheral edge 1009 of the solid wood panel 1000 perpendicular to its wood grain direction 1002 is preferably not tightly fit against the inner stepped edge 1034 of the frame 1030. Since relatively little volume can be saved by shipping frame-and-panel doors in an unassembled state, such doors are preferably preassembled by the manufacturer.

Figure 14:
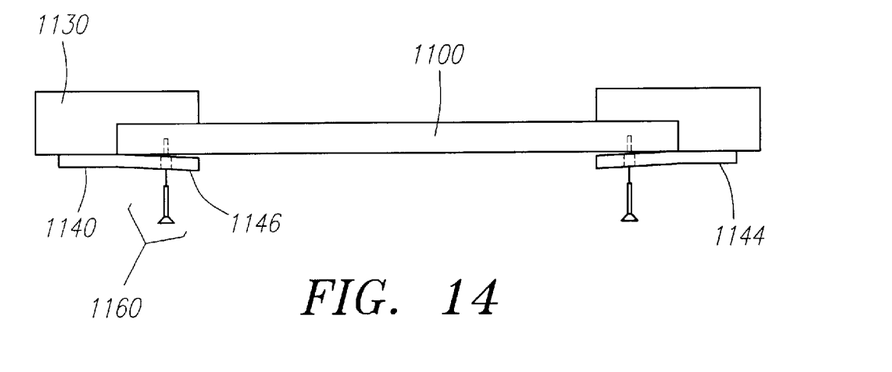
FIG. 14 is a side sectional view of a first alternative embodiment of the present invention directed to a frame-and-panel door.

FIG. 14 provides a side sectional view of a first alternative embodiment of the present invention directed to a frame-and, panel door. The present embodiment is substantially identical to the embodiment previously illustrated in FIGS. 12–13, but with the exception that the present embodiment utilizes an inner bent portion 1046 of each bracket 1040, 1044 (instead of the optional beveled inner edge 1010 of the solid wood panel 1000 shown in FIG. 14) to reduce the frictional contact area between the panel 1000 and the brackets 1040, 1044. This embodiment incorporates pin connections (not shown) and sliding connections 1160 in the same manner as described in connection with FIGS. 12–13.

Figure 15:
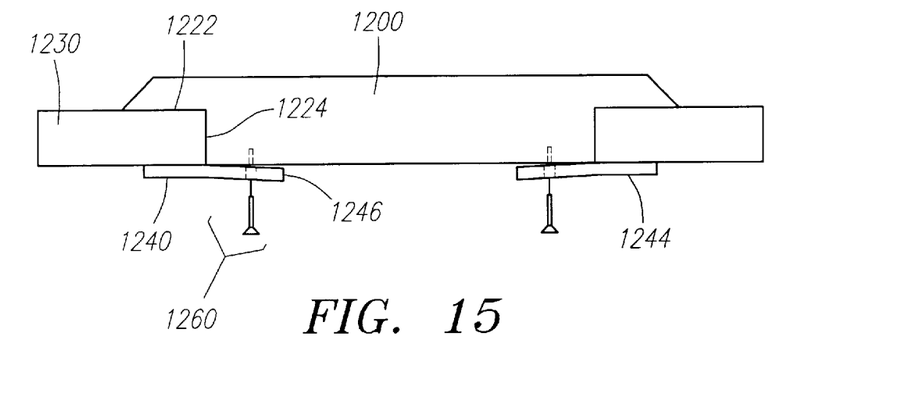
FIG. 15 is a side sectional view of a second alternative embodiment of the present invention directed to a frame-and-panel door.

FIG. 15 provides a sectional view of a second alternative embodiment of the present invention and is directed to a frame-and-panel door with a raised panel. The inward peripheral surface 1222 of the solid wood panel 1200 overlies the frame 1230, which peripherally surrounds the stepped outer edge 1224 of the solid wood panel 1200. This embodiment includes pin connections (not shown) and sliding connections 1260 in the same manner as described in connection with FIGS. 12–13, and utilizes an inner bent portion 1246 of each bracket 1240, 1244 to reduce the frictional contact area between the panel 1200 and the brackets 1240, 1244 in the same manner as described in connection with FIG. 14.

Figure 16:
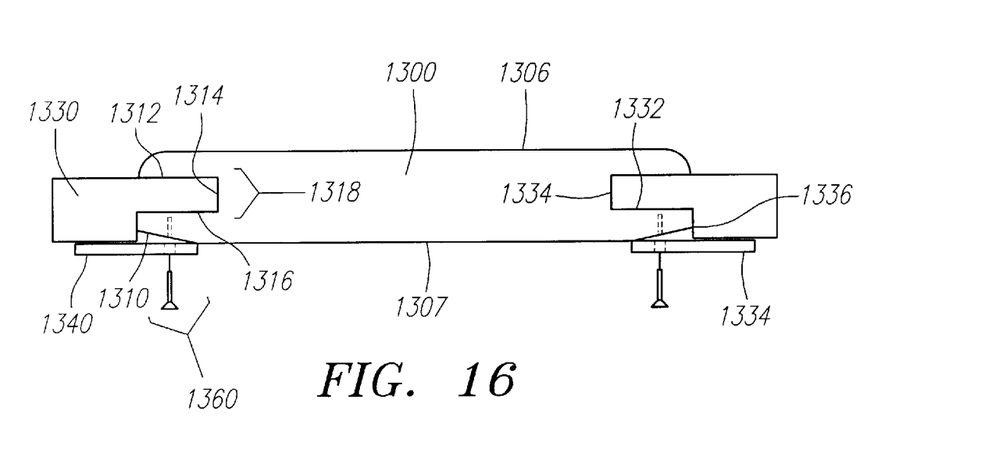
FIG. 16 is a side sectional view of a third alternative embodiment of the present invention directed to a frame-and-panel door.

FIG. 16 provides a side sectional view of a third alternative embodiment of the present invention directed to a frame-and-panel door with an interlocking raised panel. A recessed inward peripheral surface 1312, a recessed peripheral edge 1314, and a recessed outward peripheral surface 1316 of the solid wood panel 1300 form a peripheral channel 1318 which interlocks with the frame 1330. The frame 1330 is preferably assembled around the solid wood panel 1300. Since the interlocking arrangement between the frame 1330 and the solid wood panel 1300 prevents separation between the frame 1330 and the panel 1300, each sliding connection 1360 (in addition to beveled inner edge 1310) is rendered optional. As described in conjunction with FIG. 13, it remains important that a gap (not shown) be provided between each edge (not shown) of the solid wood panel 1300 parallel to its wood grain direction 1002 (not shown) and the inner edge 1334 and the inner stepped edge 1336 of the frame 1330 to ensure that the solid wood panel 1300 is not peripherally restrained against expansion. Because the solid wood panel 1300 is therefore 'floating' inside the frame, however, pin connections (not shown) are still required between each bracket 1340, 1344 and the solid wood panel 1300 to prevent the solid wood panel 1300 from shifting within its surrounding frame 1330 when the door is operated.

Figure 17:
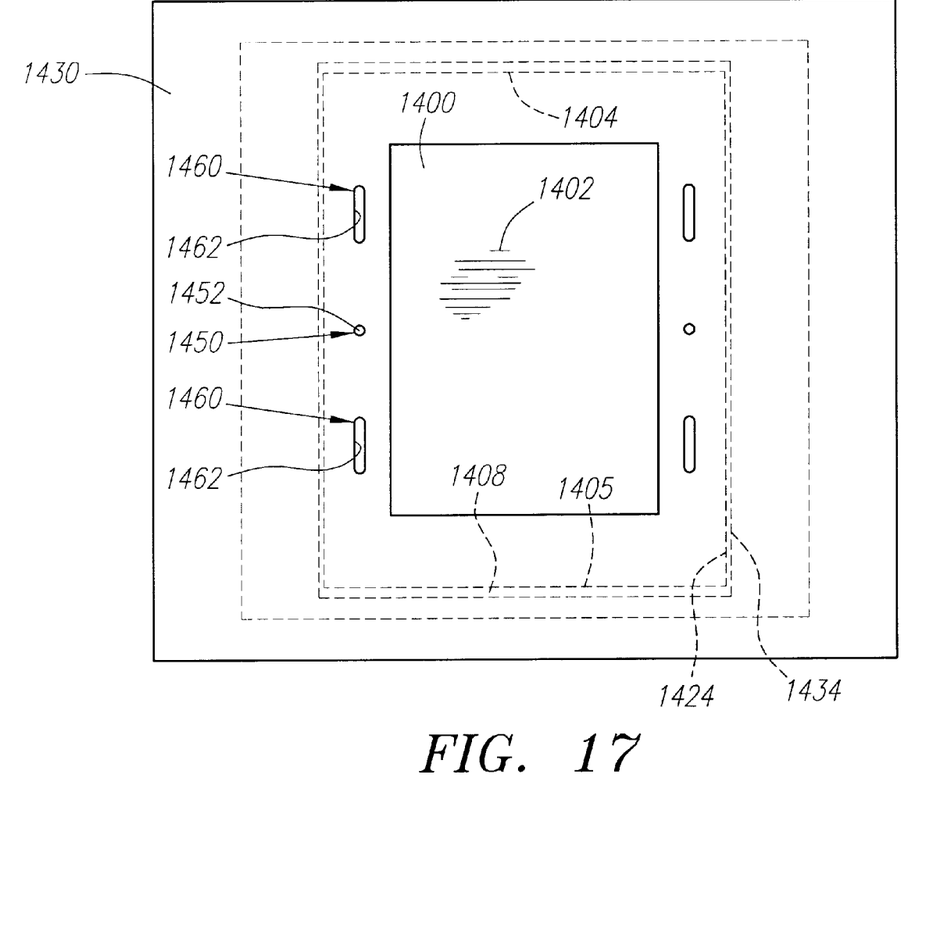
FIG. 17 is a rear view of a fourth alternative embodiment of the present invention directed to a frame-and-panel door.
Figure 18:
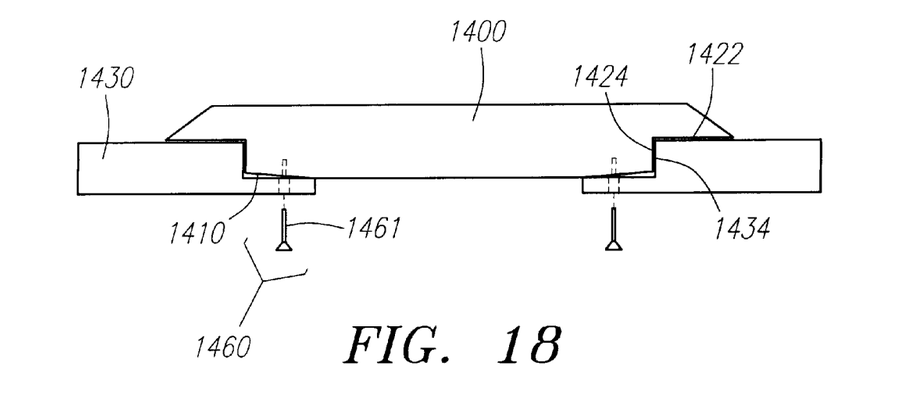
FIG. 18 provides a side sectional view of the frame-and-panel door of FIG. 17.

FIGS. 17–18 are directed to a frame-and-panel door where the brackets are integral to the frame 1430. Integrating such brackets into the frame 1430 permitted by the substantially coplanar attachment between the frame 1430 and the solid wood panel 1400; such integration is not believed to be possible under the present invention in embodiments directed to RTA furniture such as tables.

The solid wood panel 1400 is supported in position directly by the frame 1030 with pin connections 1450 and sliding connections 1460 which permit the solid wood panel 1400 to expand freely in a direction perpendicular to its wood grain direction 1402. Each pin connection 1450 is collinearly arranged along the wood grain direction 1402, and includes an aperture 1452 defined in each bracket 1040, 1044 and connecting hardware (not shown) such as screws, nails, or staples. Each sliding connection 1460 is oriented substantially perpendicular to the wood grain direction 1402 of the solid wood panel 1400. Each sliding connection 1460 includes a slot 1462 and connecting hardware (shown in FIG. 18) preferably comprising tapered head screws 1461 (shown in FIG. 18). Alternatively, other connecting hardware which may readily adjusted to provide optimum clamping force, comprising by way of example threaded bolts or studs and nuts, may be used as connecting hardware for each sliding connection 1460. To ensure that the solid wood panel 1400 is not peripherally restrained against expansion, it is important to ensure that a gap 1408 is left between each edge 1404, 1405 of the solid wood panel 1400, the gap being parallel to the wood grain direction 1002 and the inner stepped edge 1434 (shown in FIG. 18).

The raised panel 1400 is more visible in FIG. 18. The inward peripheral surface 1422 of the solid wood panel 1400 overlies the frame 1430, which peripherally surrounds a stepped outer edge 1424 of the solid wood panel 1400 at a stepped inner edge 1434 of the frame 1430. An optional beveled inner edge 1410 of the solid wood panel 1400, adjacent to the pin connections 1450 and sliding connections 1460, reduces the frictional contact area between the solid wood panel 1400 and the frame 1430 to promote smooth operation of each sliding connection 1460. To ensure that each sliding connection 1460 operates smoothly, each peripheral edge 1424 of the solid wood panel 1400 perpendicular to its wood grain direction 1402 should not be tightly fit against the inner stepped edge 1434 of the frame 1030.

The following language is not directed to any particular drawing, but rather to the previously-described embodiments as a group. Because it is typically more expensive to produce substantially planar members from solid wood than from other structural materials, such as wood composites, substantially planar solid wood members are often used only in applications which highlight their appearance. Accordingly, in preferred embodiments of the present invention, both the pin and sliding types of connections do not penetrate completely through the substantially planar solid wood member, since complete penetration would mar the appearance of this member. Moreover, in certain embodiments such as those directed to a table, complete penetration through the outward surface of this member would also impair its function.

Although the present invention is directed to providing a sturdy but partially restrained connection between one or more supporting members and a substantially planar solid wood member, it is not limited to supporting members which are fabricated from solid wood. On the contrary, supporting members which would be compatible with the present invention may be fabricated from most any fairly rigid material well known to those skilled in the art. By way of example only, supporting members may be fashioned from solid wood, wood composites with or without various veneers or decorative coatings, fiberglass, metal, rigid plastic, or even stone or glass.

The present invention has thus been shown and described with reference to the specific embodiments. However, it should be noted that the present invention is in no way limited to the details of the described arrangements; changes and modifications may be made without departing from the scope of the appended claims.

What is claimed is:

1. A structural assembly comprising:
   a substantially planar solid wood member having a wood grain direction, a first and a second planar surface, and at least one peripheral edge;
   at least one supporting member; and
   at least two joining members each having a longitudinal axis and positioned on said substantially planar solid wood member so that their longitudinal axes are oriented in parallel with respect to each other, and oriented substantially perpendicular to said wood grain direction of said substantially planar solid wood member, wherein said at least two joining members are rigidly connected to said at least one supporting member, and said substantially planar solid wood member is connected to said at least one supporting member via said at least two joining members, each of said at least two joining members having a pin connection to said substantially planar solid wood member and at least one sliding connection to the substantially planar solid wood member.

2. The structural assembly according to claim 1, wherein said at least two joining members each define at least one longitudinal slot through which said at least one sliding connection to said substantially planar solid wood member is made.

3. The structural assembly according to claim 2, wherein said at least two joining members each further define an aperture through which said pin connection to said substantially planar solid wood member is made.

4. The structural assembly according to claim 1, wherein said at least two joining members are rigidly but removably connected to said at least one supporting member.

5. The structural assembly according to claim 4, wherein said at least one supporting member comprises at least one table leg which, when said substantially planar solid wood member is oriented in a horizontal plane, protrudes downward from said substantially planar solid wood member to rest on a level surface.

6. The structural assembly according to claim 5, further comprising at least one apron member, wherein said at least one leg comprises multiple legs, each of said multiple legs being connected to at least one other of said multiple legs with an apron member to enhance structural rigidity.

7. The structural assembly according to claim 1, wherein said at least one supporting member comprises a cabinet door frame defining an aperture into which said substantially planar solid wood member may be positioned.

8. A structural assembly comprising:
a substantially planar solid wood member having a wood grain direction, a first and a second planar surface and at least one peripheral edge;
at least one supporting member;
at least two joining members each having a longitudinal axis and positioned on said substantially planar solid wood member so that their longitudinal axes are oriented in parallel with respect to each other, and oriented substantially perpendicular to said wood grain direction of said substantially planar solid wood member,
wherein said at least two joining members are rigidly connected to said at least one supporting member, and said substantially planar solid wood member is connected to said at least one supporting member via said at least two joining members, each of said at least two joining members having:
means for connecting said substantially planar solid wood member to each of said at least two joining members with a pin connection; and
means for connecting said substantially planar solid wood member to each of said at least two joining members with at least one sliding connection.

9. The structural assembly according to claim 8, wherein said at least two joining members each define at least one longitudinal slot, and further wherein said means for connecting said substantially planar solid wood member to each of said at least two joining members with a sliding connection comprises at least one screw driven through said at least one longitudinal slot into said substantially planar solid wood member.

10. The structural assembly according to claim 8, wherein said at least two joining members each define an aperture, and further wherein said means for connecting said substantially planar solid wood member to each of said at least two joining members with a pin connection comprises a screw driven through said aperture into said substantially planar solid wood member.

11. The structural assembly according to claim 8, wherein said at least two joining members are rigidly but removably connected to said at least one supporting member.

12. The structural assembly according to claim 1, wherein said at least one supporting member comprises at least one leg which, when said substantially planar solid wood member is oriented in a horizontal plane, protrudes downward from said substantially planar solid wood member to rest on a level surface.

13. The structural assembly according to claim 11, further comprising at least one apron member, wherein said at least one leg comprises multiple legs, each of said multiple legs being connected to at least one other of said multiple legs with an apron member to enhance structural rigidity.

14. The structural assembly according to claim 8, wherein said at least one supporting member comprises a cabinet door frame defining an aperture into which said substantially planar solid wood member may be positioned.

15. A table comprising:
a substantially planar solid wood member having a wood grain direction, a first and a second planar surface, and at least one peripheral edge;
four table legs;
two apron members which each interconnect two of said four table legs;
two joining members each having a longitudinal axis and positioned on said substantially planar solid wood member so that their longitudinal axes are oriented in parallel with respect to each other, and oriented substantially perpendicular to said wood grain direction of said substantially planar solid wood member,
wherein said two joining members are rigidly connected to said apron members, and said two joining members each have:
a) a pin connection to said substantially planar solid wood member; and
b) two sliding connections to said substantially planar solid wood member.

16. A method of joining at least one supporting member to a substantially planar solid wood member having a wood grain direction by a partially restrained connection, the method comprising:
a) connecting at least one joining member to said substantially planar solid wood member with a pin connection;
b) connecting said at least one joining member to said substantially planar solid wood member with at least one sliding connection, said at least one sliding connection oriented substantially perpendicular to said wood grain direction; and
c) connecting said at least one supporting member to said at least one joining member.

* * * * *